(12) United States Patent
Recio et al.

(10) Patent No.: US 12,043,798 B1
(45) Date of Patent: Jul. 23, 2024

(54) FURAN-BASED POLYMER COMPOSITIONS FOR WELLBORE CONSOLIDATION OPERATIONS

(71) Applicant: Halliburton Energy Services, Inc., Houston, TX (US)

(72) Inventors: Antonio Recio, Houston, TX (US); Nicole Mast, Houston, TX (US); I Wayan Rakananda Saputra, Houston, TX (US); Philip D. Nguyen, Houston, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 0 days.

(21) Appl. No.: 18/136,108

(22) Filed: Apr. 18, 2023

(51) Int. Cl.
*C09K 8/80* (2006.01)

(52) U.S. Cl.
CPC .................................. *C09K 8/805* (2013.01)

(58) Field of Classification Search
CPC .................................................... C09K 8/805
See application file for complete search history.

(56) References Cited

U.S. PATENT DOCUMENTS

| | | | |
|---|---|---|---|
| 6,177,484 B1 | 1/2001 | Surles | |
| 6,887,834 B2 | 5/2005 | Nguyen et al. | |
| 7,104,325 B2 | 9/2006 | Nguyen et al. | |
| 7,963,330 B2 | 6/2011 | Nguyen et al. | |
| 8,167,045 B2 | 5/2012 | Nguyen et al. | |
| 9,027,648 B2 | 5/2015 | Sanders et al. | |
| 11,492,531 B1 | 11/2022 | Deville et al. | |
| 2009/0205830 A1* | 8/2009 | Nguyen | C09K 8/508 |
| | | | 166/295 |
| 2014/0262294 A1* | 9/2014 | Sanders | C09K 8/805 |
| | | | 166/308.2 |
| 2018/0346801 A1* | 12/2018 | Dandawate | C09K 8/68 |

* cited by examiner

*Primary Examiner* — Crystal J Lee
(74) *Attorney, Agent, or Firm* — Barnes & Thornburg LLP

(57) ABSTRACT

Compositions and methods for treating a well with a treatment fluid. An example method prepares a treatment fluid by combining a furan-based polymer, a Bronsted acid, at least one of an anhydride and/or dibasic ester, a wetting agent, and a docking agent. The treatment fluid is introduced into a wellbore and a wellbore operation is performed with the treatment fluid.

7 Claims, 6 Drawing Sheets

FURAN-BASED POLYMER COMPOSITIONS FOR WELLBORE CONSOLIDATION OPERATIONS

TECHNICAL FIELD

The present disclosure relates generally to wellbore operations, and more particularly, to the use of furan-based polymer compositions comprising Bronsted acids and dibasic esters or anhydrides for wellbore consolidation operations.

BACKGROUND

During a wellbore operation, a treatment fluid may be introduced into the wellbore to treat the subterranean formation. Some treatment fluids comprise resins to consolidate particulates such as proppant, fines, or the material of the subterranean formation itself. The resins may act by binding the particulates together, thereby aggregating them and preventing their separation. In the case of proppant, this binding may prevent proppant flow back and may also consolidate the proppant into packs or pillars used to resist fracture closure. The consolidation of fines may be done to prevent fine particulates from escaping filtration mechanisms such as filters and gravel packs. Unconsolidated fines may flow within the wellbore fluids through wellbore equipment potentially resulting in later issues such as damage to the equipment. Stabilization of the subterranean formation may be done to prevent the formation from eroding, thereby reducing or impeding production.

Formulating the resin compositions for the treatment fluids may be difficult as some resins may be difficult to pump due to their viscosity. Additionally, some resins may react quicker than desired leading to poor placement. The use of resins in treatment fluids is an important part of many wellbore operations. The present invention provides improved resin formulations for treatment fluids used in wellbore operations.

BRIEF DESCRIPTION OF THE DRAWINGS

Illustrative examples of the present disclosure are described in detail below with reference to the attached drawing figures, which are incorporated by reference herein, and wherein.

Figure 1:
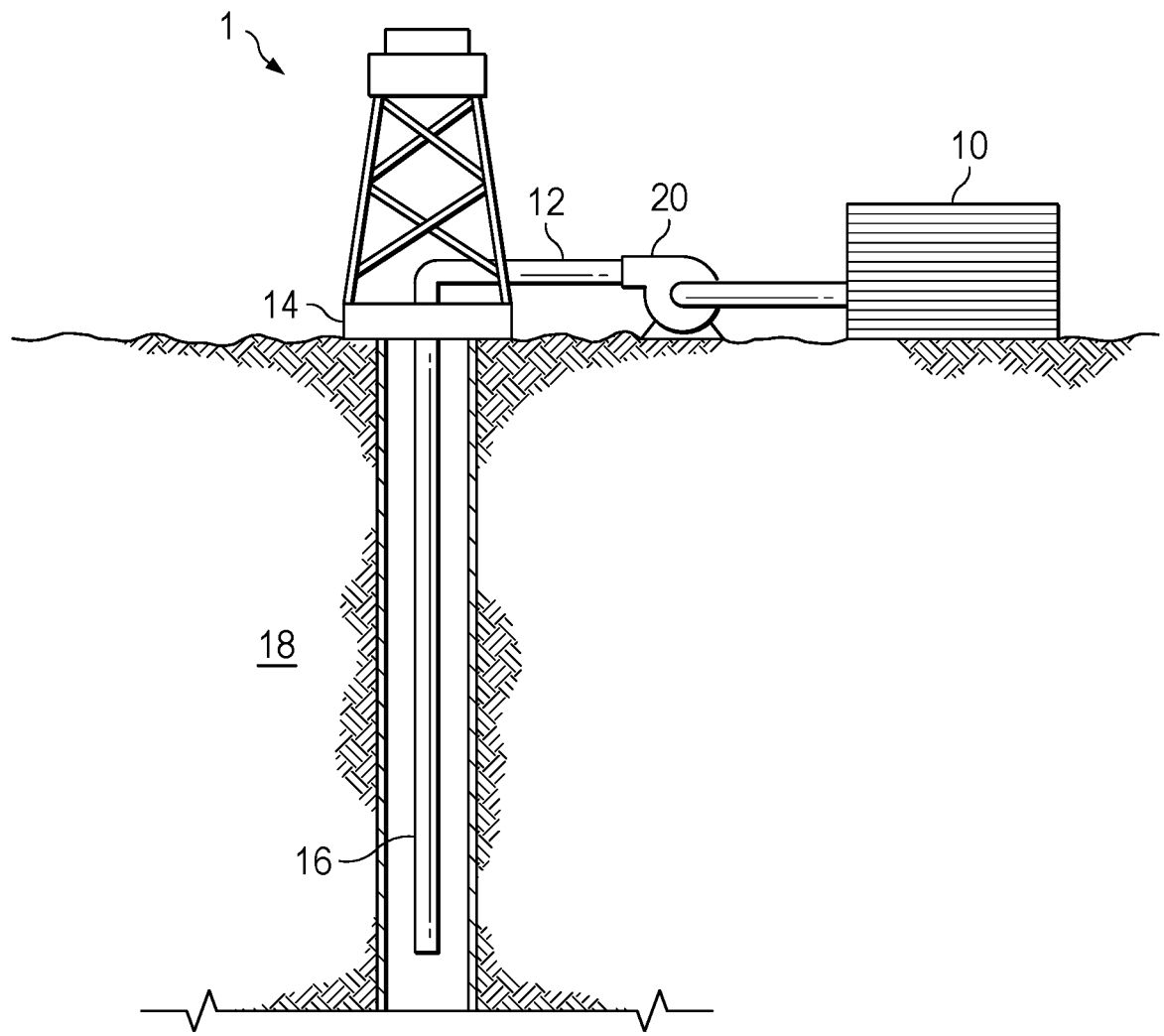
FIG. 1 is an illustrative schematic of a system that can deliver examples of the treatment fluids to a downhole location in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of furan-based polymer compositions comprising Bronsted acids and dibasic esters or anhydrides for wellbore consolidation operations.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to the use of treatment fluid comprising furan-based polymers, Bronsted acids, and dibasic esters and/or anhydrides for wellbore consolidation operations. The treatment fluids described herein may be used in a variety of wellbore operations performed in subterranean formations. Examples of these wellbore operations generally include any coating or consolidation operation. More specifically, the wellbore operations may be used for proppant coating, formation consolidation and stabilization, fines control and consolidation, and the like. Advantageously, the treatment fluids comprise a furan-based polymer, a Bronsted acid, and an anhydride and/or dibasic ester. It has been discovered that the use of Bronsted acids provide overly reactive resin formulations which may cure prematurely and impact the wellbore operation due to the increased viscosity of the formulation. The use of glycol-based diluents reduced this reactivity, but also reduced the necessary compressive strength needed for some wellbore operations. Advantageously, it was discovered that the addition of an anhydride or a dibasic ester in place of the glycol-based diluent, reduced the reactivity imparted by the Bronsted acid, but also provided the consolidation strength necessary to perform the coating and consolidation operations. As a further advantage, the dibasic ester and/or anhydride functions as the diluent as well as the reactive component, and because of this the treatment fluid may not comprise a glycol-base diluent. As a further advantage, the treatment fluid may not comprise an aromatic-based diluent. An additional advantage is that the resin compositions exhibit a lower onset temperature for resin curing. This lower onset temperature may impact the crystallinity of the cured resin polymer, which may manifest through the strength imparted on the consolidated resin. One other advantage is that the resin formulations incorporating a Bronsted acid may possess a higher unconfined compressive strength than comparable cured resins lacking the Bronsted acid. A further advantage is that the inclusion of the Bronsted acid in the treatment fluids may allow for their use in subterranean formations that are sensitive to hydrochloric acid. Additionally, the treatment fluids possess viscosities and desirable cure times allowing for easier pumping of the treatment fluids and a reduced risk of screen outs.

The treatment fluids described herein comprise a furan-based polymer, a Bronsted acid, an anhydride and/or dibasic ester, a wetting agent, and a docking agent. These components may be provided and mixed in any order. In some examples, the prepared treatment fluid may be mixed with a particulate at the surface, such as a proppant particulate, to coat the proppant particulate before it is pumped into the wellbore. In other examples, the prepared treatment fluid may be introduced into the wellbore without mixing with a particulate. In this example, the treatment fluid will consolidate a particulate such as a proppant, formation material, or a fine within the wellbore.

The treatment fluids comprise a furan-based polymer to consolidate and aggregate materials such as particulates, formation materials, fines, and the like. The furan-based polymer is capable of reacting or polymerizing in the presence of the Bronsted acid. The furan-based polymer comprises substituted furan moieties and is produced from one or more species of various furan monomers. Examples of the furan-based monomers include, but are not limited to, furfuryl alcohol, furfuryl acetate, 1-(2-furyl)-1-ethanol, 2-(2-furyl)-2-propanol, 2,5-bis(hydroxymethyl) furan, 1-(5-hydromethyl-2-furyl)-ethanol, 1,1-bis(5-hydroxymethyl-2-furyl)-ethane, 5-hydroxymethyl-2-vinylfuran, 5-hydroxymethyl furfural, 5-hydroxymethyl-2-furancaboxylic acid, 2,5-furandicarboxyaldehyde, 5-formyl-2-furancarboxylic acid, 2,5-furandicarboxylic acid, 5-hydroxymethyl furfurylidenester, or any combination of furan-based monomers. In a specific example, the furan-based polymer is a preformed furfuryl alcohol polymer having a viscosity between about 400 to about 2500 cP.

The concentration of the furan-based polymer in a treatment fluid may range from about 15% to about 60% wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the furan-based polymer in the treatment fluid may range from about 15% to about 60% wt. %, from about 20% to about 60% wt. %, from about 25% to about 60% wt. %, from about 30% to about 60% wt. %, from about 35% to about 60% wt. %, from about 40% to about 60% wt. %, from about 45% to about 60% wt. %, from about 50% to about 60% wt. %, or from about 55% to about 60% wt. %. As another example, the concentration of the furan-based polymer in the treatment fluid may range from about 15% to about 60% wt. %, from about 15% to about 55% wt. %, from about 15% to about 50% wt. %, from about 15% to about 45% wt. %, from about 15% to about 40% wt. %, from about 15% to about 35% wt. %, from about 15% to about 30% wt. %, from about 15% to about 25% wt. %, or from about 15% to about 20% wt. %. With the benefit of this disclosure, one of ordinary skill in the art will be readily able to prepare and select a furan-based polymer having a desirable concentration for the treatment fluid for a given application.

The treatment fluids comprise a Bronsted acid to induce reaction and polymerization of the furan-based polymer. Suitable Bronsted acids are characteristic of the −log of the acid dissociation constant: $pKa = -\log_{10} K_a$; where the $pKa \leq 2$. Examples of the Bronsted acid include, but are not limited to, include hydrogen bromide (HBr), hydrogen chloride (HCl), sulfuric acid ($H_2SO_4$), phosphoric acid ($H_3PO_4$), nitric acid ($HNO_3$), trifluoromethanesulfonic acid (triflic acid), 1,3,5-triazine-2,4,6-triol (cyanuric acid), methanesulfonic acid (MSA), toluene sulfonic acid (PTSA), ethyl, N-(phosphonomethyl)iminodiacetic acid, trifluoroacetic acid (TFA), maleic acid, alkylbenzene sulfonic acids, dodecylbenzene sulfonic acid, or any combination of Bronsted acid.

The concentration of the Bronsted acid in a treatment fluid may range from about 0.5% to about 10% wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the Bronsted acid in the treatment fluid may range from about 0.5% to about 10% wt. %, from about 1% to about 10% wt. %, from about 2% to about 10% wt. %, from about 3% to about 10% wt. %, from about 4% to about 10% wt. %, from about 5% to about 10% wt. %, from about 6% to about 10% wt. %, from about 7% to about 10% wt. %, from about 8% to about 10% wt. %, or from about 9% to about 10% wt. %. As another example, the concentration of the Bronsted acid in the treatment fluid may range from about 0.5% to about 10% wt. %, from about 0.5% to about 9% wt. %, from about 0.5% to about 8% wt. %, from about 0.5% to about 7% wt. %, from about 0.5% to about 6% wt. %, from about 0.5% to about 5% wt. %, from about 0.5% to about 4% wt. %, from about 0.5% to about 3% wt. %, from about 0.5% to about 2% wt. %, or from about 0.5% to about 1% wt. %. With the benefit of this disclosure, one of ordinary skill in the art will be readily able to prepare and select a Bronsted acid having a desirable concentration for the treatment fluid for a given application.

The treatment fluids comprise an anhydride and/or a dibasic ester to function as both a diluent as well as to maintain a desired level of reactivity for the furan-based polymer. Suitable anhydrides or dibasic esters are those that hydrolyze to form multiple equivalents of either carboxylic-, sulfonic-, and/or phosphoric acid. Examples of the anhydride include, but are not limited to, furan-2,5-dione (maleic anhydride), 2,3-dichloromaleic anhydride, 3-methlyfuran-2,5-dione (citraconic anhydride), isobenzofuran-1,3-dione (phthalic anhydride), 4-nitroisobenzofuran-1,3-dione (4-nitrophthalic anhydride), 4,5,6,7-tetrabromoisobenzofuran-1,3-dione (tetrabromophthalic anhydride), 4,5,6,7-tetrachloroisobenzofuran-1,3-dione (tetrachlorophthalic anhydride), 1,2-cyclohexanedicarboxylic anhydride, bicyclo[2.2.1]hept-5-ene-2,3-dicarboxylic anhydride, 2,2,2-trifluoroacetic anhydride, or any combination of anhydride. Examples of the dibasic ester include, but are not limited to, dibenzyl malonate, dimethyl malonate, 2,2-dimethyl-1,3-dioxane-4,6-dione (Meldrum's acid), dialkyl maleate, diaryl maleate, dialkyl phthalate, diaryl phthalate, dialkyl glutarate, diaryl glutarate, dimethyl 2-methylpentanedioate, dimethyl 2-ethylpentanedioate, dialkyl succinate, diaryl succinate, dialkyl adipate, diaryl adipate, or any combination of dibasic ester. It is to be understood that the anhydride(s) and dibasic ester(s) may be used by themselves or in combination with each other. For example, both an anhydride and dibasic ester may be used in the same treatment fluid in some examples. In a specific example, the dibasic ester is a mixture of dimethyl succinate, dimethyl glutarate, and dimethyl adipate. In another example the mixture of dimethyl succinate, dimethyl glutarate, and dimethyl adipate is a 30/70/30 mixture.

The concentration of the anhydride or dibasic ester in a treatment fluid may range from about 40% to about 75% wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the anhydride or dibasic ester in the treatment fluid may range from about 40% to about 75% wt. %, from about 45% to about 75% wt. %, from about 50% to about 75% wt. %, from about 55% to about 75% wt. %, from about 60% to about 75% wt. %, from about 65% to about 75% wt. %, or from about 70% to about 75% wt. %. As another example, the concentration of the anhydride or dibasic ester in the treatment fluid may range from about 40% to about 75% wt. %, from about 40% to about 70% wt. %, from about 45% to about 65% wt. %, from about 45% to about 60% wt. %, from about 45% to about 60% wt. %, from about 45% to about 55% wt. %, or from about 45% to about 50% wt. %. With the benefit of this disclosure, one of ordinary skill in the art will be readily able to prepare and select an anhydride or dibasic ester having a desirable concentration for the treatment fluid for a given application.

The treatment fluids comprise a wetting agent to render the formation oil-wet, for example, to reduce the affinity of the formation to water thereby enhancing the affinity of the furan-based polymer to the formation or other material such as sand. Generally, the wetting agent comprises a quaternized alkyl amine salt or a quaternized polyamine salt. Specific examples of the wetting agent include, but are not limited to, cetyl, dimethyl, benzyl ammonium bromide or chloride.

The concentration of the wetting agent in a treatment fluid may range from about 0.25% to about 15% wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the wetting agent in the treatment fluid may range from about 0.25% to about 15% wt. %, from about 0.5% to about 15% wt. %, from about 1% to about 15% wt. %, from about 2% to about 15% wt. %, from about 3% to about 15% wt. %, from about 4% to about 15% wt. %, from about 5% to about 15% wt. %, from about 6% to about 15% wt. %, from about 7% to about 15% wt. %, from about 8% to about 15% wt. %, from about 9% to about 15% wt. %, from about 10% to about 15% wt. %, from about 11% to about 15% wt. %, from about 12% to about 15% wt. %, from about 13% to about 15% wt. %, or from about 14% to about 15% wt. %. As another example, the concentration of the wetting agent in the treatment fluid may range from about 0.25% to about 15% wt. %, from about 0.25% to about 14% wt. %, from about 0.25% to about 13% wt. %, from about 0.25% to about 12% wt. %, from about 0.25% to about 11% wt. %, from about 0.25% to about 10% wt. %, from about 0.25% to about 9% wt. %, from about 0.25% to about 8% wt. %, from about 0.25% to about 7% wt. %, from about 0.25% to about 6% wt. %, from about 0.25% to about 5% wt. %, from about 0.25% to about 4% wt. %, from about 0.25% to about 3% wt. %, from about 0.25% to about 2% wt. %, from about 0.25% to about 1% wt. %, or from about 0.25% to about 0.5% wt. %. In one preferred example, the concentration of the wetting agent is from about 0.25% to about 5% wt. %. In another preferred example, the concentration of the wetting agent is from about 0.5% to about 4% wt. %. With the benefit of this disclosure, one of ordinary skill in the art will be readily able to prepare and select a wetting agent having a desirable concentration for the treatment fluid for a given application.

The treatment fluids comprise a docking agent to covalently bind to the surface of some materials (e.g., sand) and then to bind the furan-based polymer to another end of the docking agent, thereby linking the bound sand to the furan-based polymer with the docking agent. Generally, the docking agent is a silane. In some examples, the silane is an alkylaminosilane. Specific examples of the docking agent include, but are not limited to, 3-aminopropyltrimethoxysilane (APTMS), N-(6-aminohexyl)aminomethyltriethoxysilane (AHAMTES), N-(2-aminoethyl)-3-aminopropyltriethoxysilane (AEAPTES), and N-(2-aminoethyl)-3-aminopropyltrimethoxysilane (AEAPTMS).

The concentration of the docking agent in a treatment fluid may range from about 0.25% to about 10% wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the docking agent in the treatment fluid may range from about 0.25% to about 10% wt. %, from about 0.5% to about 10% wt. %, from about 1% to about 10% wt. %, from about 2% to about 10% wt. %, from about 3% to about 10% wt. %, from about 4% to about 10% wt. %, from about 5% to about 10% wt. %, from about 6% to about 10% wt. %, from about 7% to about 10% wt. %, from about 8% to about 10% wt. %, or from about 9% to about 10% wt. %. As another example, the concentration of the docking agent in the treatment fluid may range from about 0.25% to about 10% wt. %, from about 0.25% to about 9% wt. %, from about 0.25% to about 8% wt. %, from about 0.25% to about 7% wt. %, from about 0.25% to about 6% wt. %, from about 0.25% to about 5% wt. %, from about 0.25% to about 4% wt. %, from about 0.25% to about 3% wt. %, from about 0.25% to about 2% wt. %, from about 0.25% to about 1% wt. %, or from about 0.25% to about 0.5% wt. %. In one preferred example, the concentration of the docking agent is from about 0.25% to about 5% wt. %. In another preferred example, the concentration of the docking agent is from about 0.5% to about 4% wt. %. With the benefit of this disclosure, one of ordinary skill in the art will be readily able to prepare and select a docking agent having a desirable concentration for the treatment fluid for a given application.

The treatment fluids have viscosities that allow for pumping within the wellbore. As the operation proceeds, the treatment fluid may increase in viscosity as the furan-based polymer begins to cure. This viscosification of the treatment fluid is delayed by the presence of the anhydride and/or dibasic ester. In some examples the treatment fluid may possess a viscosity of between about 5 cP to about 1500 cP at a time period greater than or equal to 8 hours and at a temperature greater than or equal to 140° F. Moreover, the use of the anhydride and/or dibasic ester improves the compressive strength of the cured treatment fluid. In some examples, the cured treatment fluid possesses an unconfined compressive strength greater than or equal to 200 psi after a seven day cure at 176° F.

The treatment fluids may be used in a variety of wellbore temperatures. For example, the treatment fluids may be used in wellbores having temperatures in a range of about 65° F to about 700° F. In a specific example, the wellbore has a temperature range of between about 65° F to about 200° F.

In some optional examples, the treatment fluids may further comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors (e.g., chelants, polyacrylic acid, etc.), iron control agents (e.g., citric acid, ascorbic acid, etc.), particulate diverters, salts, fluid loss control additives, gas, catalysts, clay control agents, dispersants, flocculants, scavengers (e.g., H2S scavengers, CO2 scavengers or O2 scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

The treatment fluids have a density suitable for a particular application. By way of example, the treatment fluids may have a density in a range of from about 4 pounds per gallon ("lb/gal") to about 20 lb/gal, in a range of from about 8 lb/gal to about 12 lb/gal, or in a range of from about 12 lb/gal to about 20 lb/gal. Some examples of the treatment fluids may include additives to reduce their densities, such as hollow microspheres, low-density elastic beads, or other density-reducing additives known in the art. With the benefit of this disclosure, those of ordinary skill in the art will readily recognize the appropriate density of a foamed treatment fluid for a particular application.

FIG. 1 shows an illustrative schematic of a system that can deliver examples of the treatment fluids to a downhole location. It should be noted that while FIG. 1 generally depicts a land-based system, it is to be recognized that like systems can be operated in subsea locations as well. As depicted in FIG. 1, a system 1 comprises a mixing tank 10, in which the treatment fluids described herein may be formulated. The treatment fluids are conveyed into the wellbore via a line 12 to the wellhead 14, where the treatment fluid enters a tubular 16, with the tubular 16 extending from the wellhead 14 into a subterranean formation 18. At a desired location, the treatment fluid is ejected from the tubular 16 to perform a wellbore operation such as consolidating and stabilizing proppant particulates and formations, consolidating and stabilizing the materials of the subterranean formation, and/or consolidating and aggregating fines into larger particulates. The pump 20 can be configured to raise the pressure of the treatment fluid to a desired degree before its introduction into the tubular 16. It is to be recognized that the system 1 is merely exemplary in nature and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
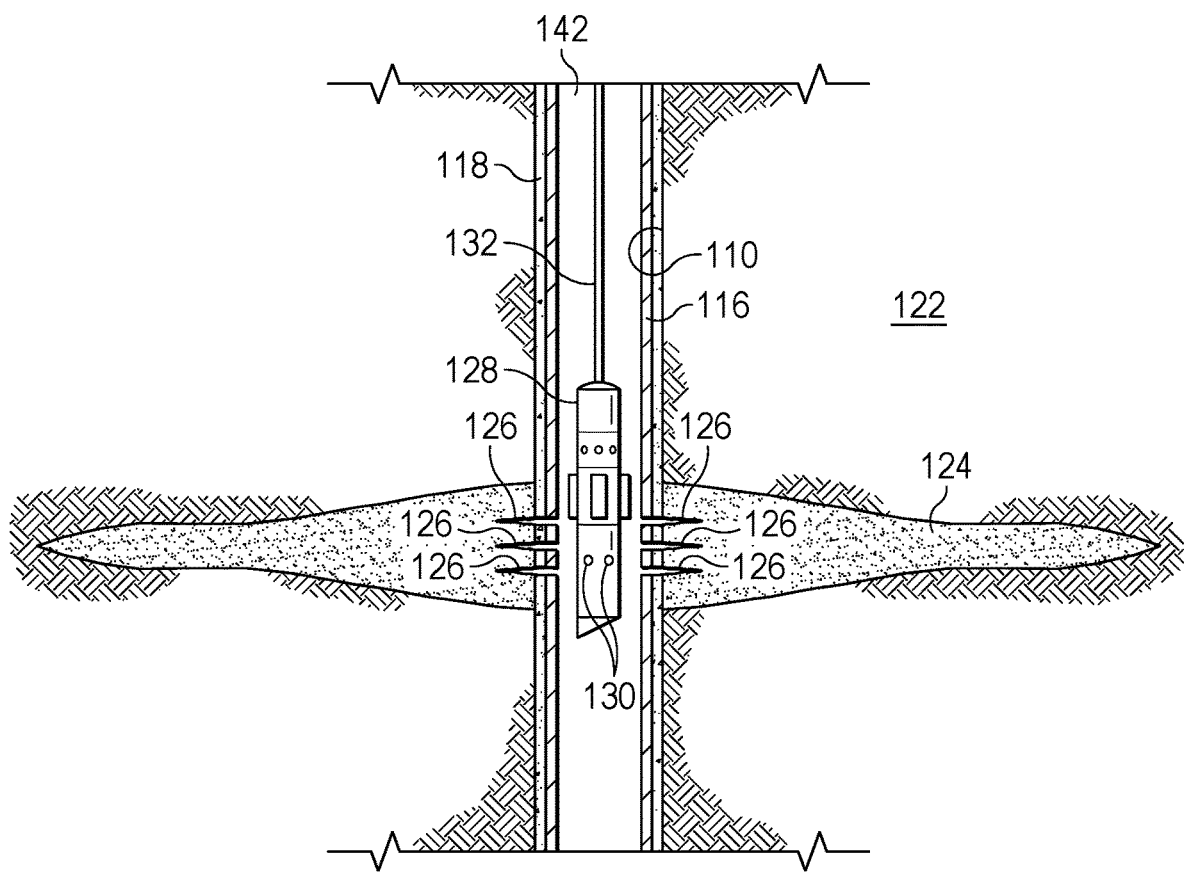
FIG. 2 is a cross-section illustrating the use of the treatment fluids described herein to consolidate proppant within a fracture of a subterranean formation in accordance with one or more examples described herein.

FIG. 2 is a cross-section illustrating the use of the treatment fluids described herein to consolidate proppant within a fracture of a subterranean formation. In a hydraulic fracturing operation, a fracture 124 is formed in a subterranean formation 122 of the wellbore 110. To initiate the operation, perforations 126 are made that penetrate through the casing 116, the cement sheath 118, and into the subterranean formation 122. After perforation of the subterranean formation 122, a treatment fluid is introduced into the fractured portion of the subterranean formation 122 through the perforations 126. While the subterranean formation 122 may be perforated using any suitable technique, the present example utilizes a jetting tool 128. The jetting tool 28 may be any suitable assembly for use in subterranean operations through which a fluid may be jetted at high pressures. By way of example, when used to form the perforations 126, the jetting tool 128 should be configured to jet a fluid against the casing 116 and the cement sheath 118 such that perforations 126 may be formed. As illustrated, the jetting tool 28 may contain ports 130 for discharging a fluid from the jetting tool 128.

In operation, the jetting tool 28 may be positioned in the wellbore 110 adjacent the portion of the wellbore 110 where fracture formation is desired. As illustrated, the jetting tool 128 may be coupled to a work string 132 (e.g., piping, coiled tubing, etc.) and lowered into the wellbore 110 to the desired position. Once the jetting tool 128 has been so positioned, a fluid may be pumped down through the work string 132, into the jetting tool 128, out through the ports 130, and against the interior surface of the casing 116 causing perforations 126 to be formed through the casing 116 and the cement sheath 118.

In accordance with the examples described herein, a proppant-laden fluid may be introduced into the fracture 124 via the jetting tool 128 or other such delivery tool. In one example, the proppant-laden fluid comprises proppant that was already coated with the treatment fluid prior to or during introduction of the proppant-laden fluid. For example, the proppant may be mixed with the treatment fluid to form a proppant coating at the surface (e.g., using the equipment of FIG. 1) and then the coated proppant may be introduced into the wellbore 110. Alternatively, the proppant may be mixed with and coated with the treatment fluid on the fly as the proppant is introduced into the wellbore 110. In yet another alternative example, the proppant-laden fluid may be introduced into the wellbore 110 and the fracture 124 without prior coating of the proppant with the treatment fluid. In this example, the treatment fluid may be introduced into the fracture 124 after the proppant is placed within the fracture 124 so as to consolidate the proppant, strengthening the formed proppant structure(s), and reducing proppant flowback out of the fracture 124. As the treatment fluid is injected into the fracture 124, it will flow into the fracture contacting, bonding with, and aggregating the contacted proppant therein.

Alternative wellbore tools for introduction of the treatment fluid may include, but are not limited to, bull heading, coil tubing, or jointed pipe (e.g., with straddle packers, jetting tools, etc.). In the present example, the treatment fluid is injected into the fracture 124 by the jetting tool 128 while the jetting tool 128 is still in position in the wellbore 110. Utilization of the jetting tool 128 may reduce the need for equipment, such as packers, to isolate the treated formation interval. Alternatively, the treatment fluid may be injected through the annulus 142 between the work string 132 and the casing 116.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
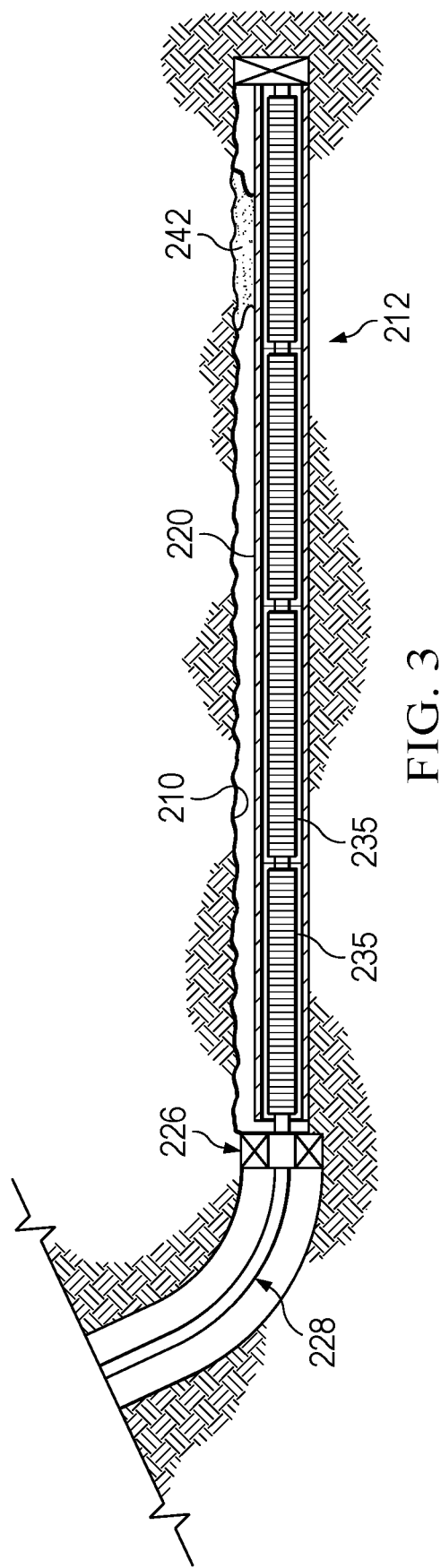
FIG. 3 is a cross-section illustrating a formation or sand consolidation operation using the treatment fluids described herein in accordance with one or more examples described herein.

FIG. 3 is a cross-section illustrating a formation or sand consolidation operation using the treatment fluids described herein. An open-hole wellbore 210 extends into an unconsolidated subterranean formation or zone 212 from a cased wellbore extending to the surface. While wellbore 210 is illustrated as a horizontal open-hole completion, it should be recognized that the present invention is also applicable to vertical or inclined wellbores, as well as to cased wellbores.

A sand screen 220 is located inside the wellbore 210. A packer 226 is attached to the sand screen 220. The packer 226 may be used to isolate a portion of the wellbore 210. In this example, a gravel slurry was introduced to form a gravel pack 242 (shown partially formed) in the annulus on the outside of the sand screen 220. A washpipe 228 is attached to the gravel pack service tool and is run inside the sand screen 220. The washpipe 228 is used to force fluid to flow around the bottom section of the sand screen 220.

The sand screen 220 may be of a single length or it may be comprised of a plurality of screen units 235 which are connected together with threaded couplings or the like (not shown). Each of the screen units 235 are similar or identical to each other and each is comprised of a perforated base pipe having a continuous length of wrap wire wound thereon, forming a screened section therein. The base pipe can have a plurality of perforations. Alternatively, other types of permeable base pipes, e.g., slotted pipe, etc., can be used without departing from the present examples.

A treatment fluid as described herein may be placed in the unconsolidated subterranean formation 212 by injecting the treatment fluid directly through the sand screen 220. In some examples, the treatment fluid can be used on wellbores (such as wellbore 210) having gravel packs 242 in place. The treatment fluid is placed in the subterranean formation 212 by direct injection through the gravel pack 242 as a means to prevent damage due to formation fines migration or as a remedial treatment to cure a sand production problem. In addition, the treatment fluid can be used to help reduce proppant flowback from a propped fracture by placing the treatment fluid into the subterranean formation 212 so as to displace and push the unconsolidated particulates (whether proppant or formations fines) into the subterranean formation 212 or deeper into the proppant pack where these particulates may be held in place with the cured treatment fluid. The treatment fluid may be used to consolidate the formation materials of the subterranean formation 212 after contact and curing of the treatment fluid. The cured formation materials may stabilize the formation, thereby preventing formation damage and reducing risks to further wellbore operations. Additionally, fines produced by the subterranean formation 212 or a gravel pack 242 may be consolidated and aggregated such that flow through into uphole wellbore equipment may be prevented.

It should be clearly understood that the example system illustrated by FIG. 3 is merely a general application of the principles of this disclosure in practice, and a wide variety of other examples are possible. Therefore, the scope of this disclosure is not limited in any manner to the details of FIG. 3 as described herein.

To facilitate a better understanding of the present embodiments, the following examples of certain aspects of some embodiments are given. In no way should the following examples be read to limit, or define, the entire scope of the embodiments.

EXAMPLES

Figure 4:
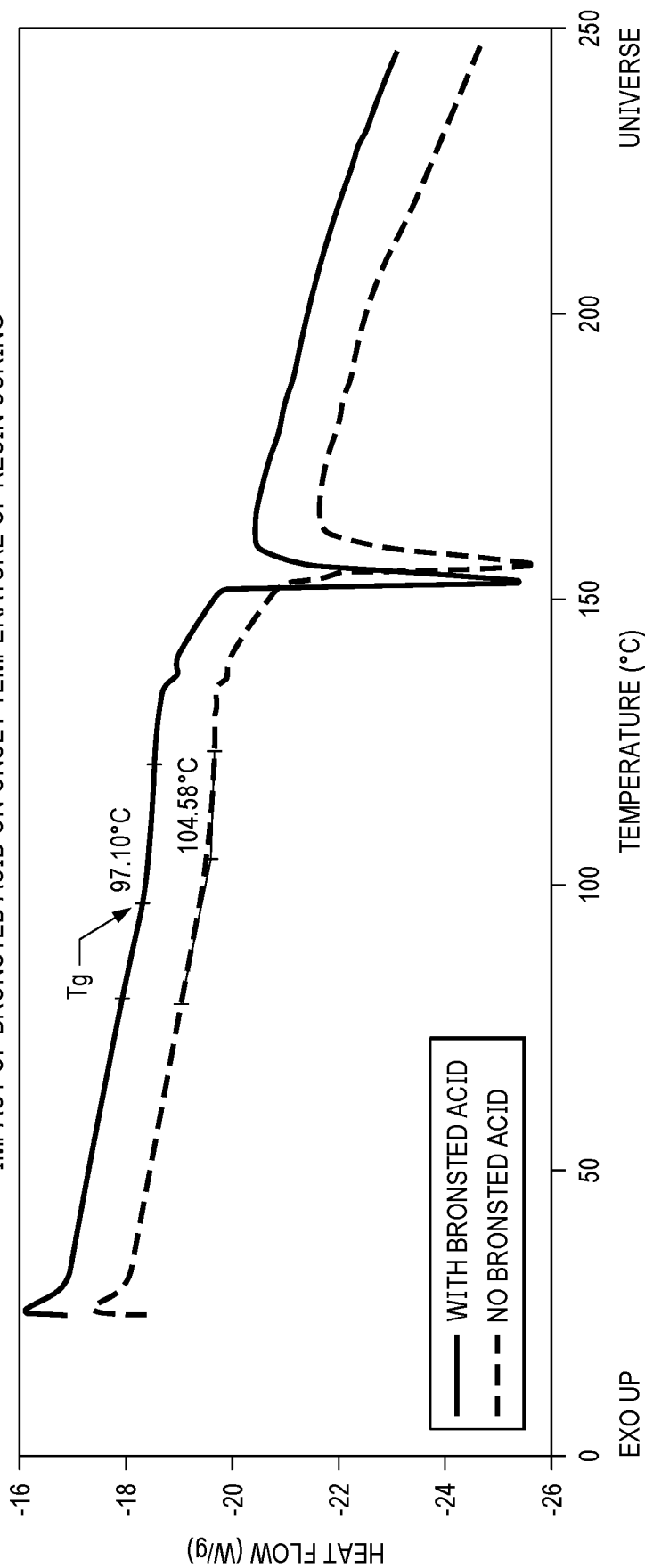
FIG. 4 is a graph of a differential scanning calorimetry analysis of the treatment fluids described herein in accordance with one or more examples described herein.

Differential scanning calorimetry analysis was performed to measure the onset temperature for resin curing of treatment fluids comprising or lacking a Bronsted acid. The results are illustrated by the graph of FIG. 4. As illustrated, the treatment fluid examples comprising the Bronsted acid exhibited a lower onset temperature for resin curing. In some examples, a lower onset temperature may impact the crystallinity of the cured resin polymer, which may improve the strength imparted to the consolidated resin.

Figure 5:
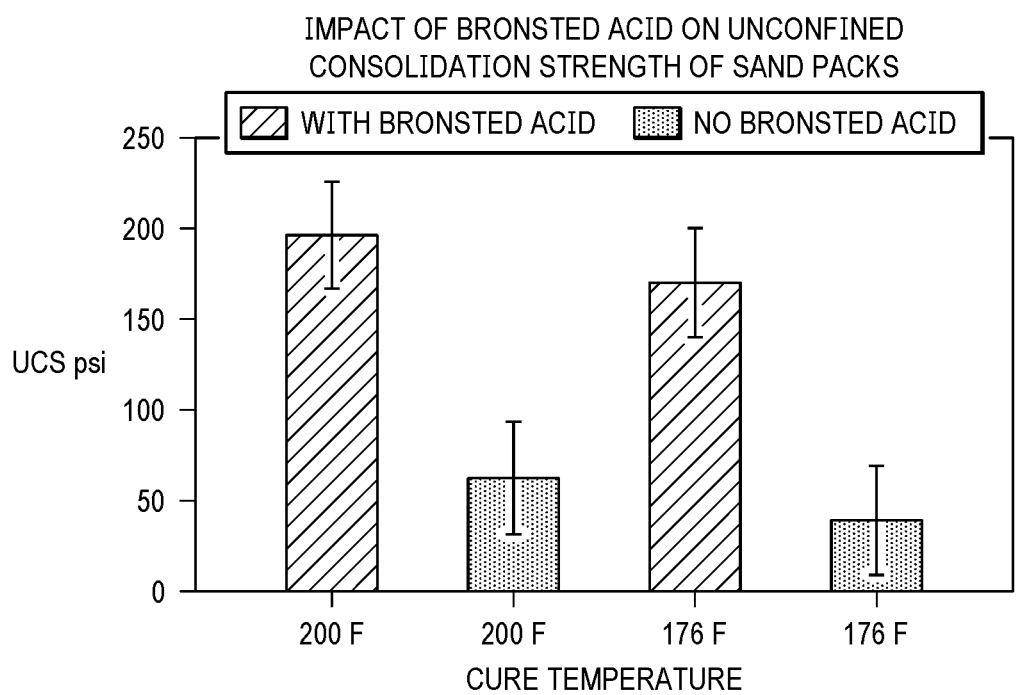
FIG. 5 is a is a graph of unconfined compressive strength experiments measuring the compressive strength of treated and consolidated sand packs at various temperatures in accordance with one or more examples described herein.

Unconfined compressive strength experiments were conducted to measure the compressive strength of treated and consolidated sand packs at various temperatures. The results are illustrated by the bar graph of FIG. 5. The sand packs treated with the treatment fluids comprising a Bronsted acid exhibited higher unconfined compressive strength values as compared to those sand packs treated with comparable treatment fluids that lacked Bronsted acids.

Figure 6:
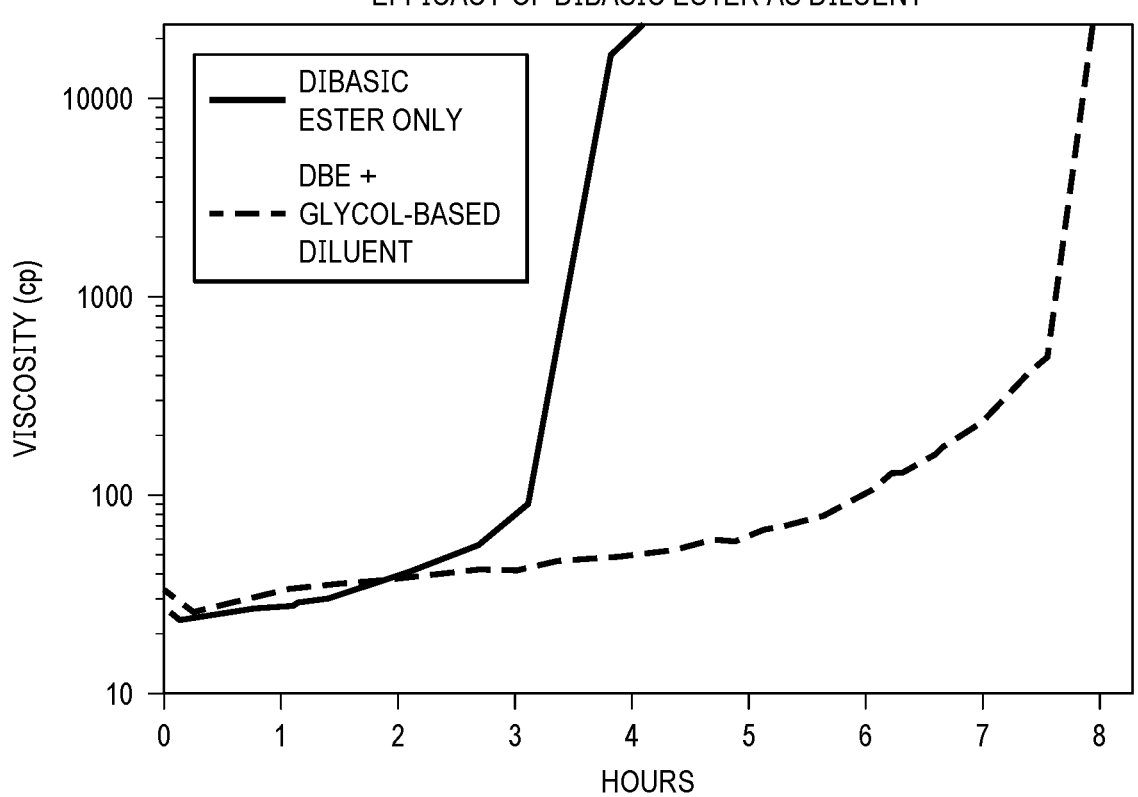
FIG. 6 is a graph of Brookfield viscometer measurements taken to analyze the viscosity of treatment fluids comprising Bronsted acids and one of either a glycol-based diluent or a dibasic ester in accordance with one or more examples described herein.

Brookfield viscometer measurements were taken to analyze the viscosity of treatment fluids comprising Bronstead acids and one of either a glycol-based diluent or a dibasic ester. The examples utilizing the dibasic ester had comparable initial viscosities as the glycol-based diluents, but also were sufficiently reactive in the absence of the glycol-based diluent. These results are illustrated by the graph of FIG. 6.

The treatment fluids disclosed herein may directly or indirectly affect one or more components or pieces of equipment associated with or which may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are treatment fluids for treating a well in accordance with the disclosure and the illustrated FIGs. An example treatment fluid comprises a furan-based polymer, a Bronsted acid, at least one of an anhydride and/or dibasic ester, a wetting agent, and a docking agent.

Additionally or alternatively, the treatment fluids may include one or more of the following features individually or in combination. The furan-based polymer may comprise a furan-based monomer selected from the group consisting of furfuryl alcohol, furfuryl acetate, 1-(2-furyl)-1-ethanol, 2-(2-furyl)-2-propanol, 2,5-bis(hydroxymethyl) furan, 1-(5-hydromethyl-2-furyl)-ethanol, 1,1-bis(5-hydroxymethyl-2-furyl)-ethane, 5-hydroxymethyl-2-vinylfuran, 5-hydroxymethyl furfural, 5-hydroxymethyl-2-furancaboxylic acid, 2,5-furandicarboxyaldehyde, 5-formyl-2-furancarboxylic acid, 2,5-furandicarboxylic acid, 5-hydroxymethyl furfurylidenester, and any combination thereof. The concentration of the furan-based polymer in the treatment fluid may range from about 15% to about 60% wt. %. The Bronsted acid may be selected from the group consisting of hydrogen bromide, hydrogen chloride, sulfuric acid, phosphoric acid, nitric acid, trifluoromethanesulfonic acid, 1,3,5-triazine-2,4,6-triol, methanesulfonic acid, toluene sulfonic acid, ethyl, N-(phosphonomethyl)iminodiacetic acid, trifluoroacetic acid, maleic acid, alkylbenzene sulfonic acids, dodecylbenzene sulfonic acid, and any combination thereof. The concentration of the Bronsted acid in the treatment fluid may range from about 0.5% to about 10% wt. %. The at least one anhydride or dibasic ester may be selected from the group consisting of furan-2,5-dione, 2,3-dichloromaleic anhydride, 3-methlyfuran-2,5-dione, isobenzofuran-1,3-dione, 4-nitroisobenzofuran-1,3-dione, 4,5,6,7-tetrabromoisobenzofuran-1,3-dione, 4,5,6,7-tetrachloroisobenzofuran-1,3-dione, 1,2-cyclohexanedicarboxylic anhydride, bicyclo[2.2.1]hept-5-ene-2,3-dicarboxylic anhydride, 2,2,2-trifluoroacetic anhydride, dibenzyl malonate, dimethyl malonate, 2,2-dimethyl-1,3-dioxane-4,6-dione, dialkyl maleate, diaryl maleate, dialkyl phthalate, diaryl phthalate, dialkyl glutarate, diaryl glutarate, dimethyl 2-methylpentanedioate, dimethyl 2-ethylpentanedioate, dialkyl succinate, diaryl succinate, dialkyl adipate, diaryl adipate, and any combination of anhydride and/or dibasic ester. The concentration of the at least one anhydride or dibasic ester in the treatment fluid may range from about 40% to about 75% wt. %. The wetting agent may be a quaternized alkyl amine salt and/or a quaternized polyamine salt. The docking agent may be selected from the group consisting of 3-aminopropyltrimethoxysilane, N-(6-aminohexyl)aminomethyltriethoxysilane, N-(2-aminoethyl)-3-aminopropyltriethoxysilane, and N-(2-aminoethyl)-3-aminopropyltrimethoxysilane, and any combination thereof. The treatment fluid may not comprise a glycol-based diluent, wherein the treatment fluid may not comprise an aromatic-based diluent.

Provided are methods for treating a well with a treatment fluid in accordance with the disclosure and the illustrated FIGs. An example method comprises preparing a treatment fluid by combining a furan-based polymer, a Bronsted acid, at least one of an anhydride and/or dibasic ester, a wetting agent, and a docking agent. The method further comprises introducing the treatment fluid into a wellbore and performing a wellbore operation with the treatment fluid.

Additionally or alternatively, the method may include one or more of the following features individually or in combination. The wellbore has a temperature, and wherein the wellbore temperature at the location in the wellbore where the wellbore operation is performed may be between about 65° to about 200° F. The treatment fluid may be coated on a proppant before introduction into the wellbore. The wellbore may penetrate a subterranean formation having a fracture; wherein the method further comprises introducing the treatment fluid into the fracture from the wellbore and contacting a proppant within the fracture with the treatment fluid. The wellbore operation may comprise pumping the treatment fluid through a gravel pack disposed in the wellbore. The furan-based polymer may comprise a furan-based monomer selected from the group consisting of furfuryl alcohol, furfuryl acetate, 1-(2-furyl)-1-ethanol, 2-(2-furyl)-2-propanol, 2,5-bis(hydroxymethyl) furan, 1-(5-hydromethyl-2-furyl)-ethanol, 1,1-bis(5-hydroxymethyl-2-furyl)-ethane, 5-hydroxymethyl-2-vinylfuran, 5-hydroxymethyl furfural, 5-hydroxymethyl-2-furancaboxylic acid, 2,5-furandicarboxyaldehyde, 5-formyl-2-furancarboxylic acid, 2,5-furandicarboxylic acid, 5-hydroxymethyl furfurylidenester, and any combination thereof. The concentration of the furan-based polymer in the treatment fluid may range from about 15% to about 60% wt. c. The Bronsted acid may be selected from the group consisting of hydrogen bromide, hydrogen chloride, sulfuric acid, phosphoric acid, nitric acid, trifluoromethanesulfonic acid, 1,3,5-triazine-2,4,6-triol, methanesulfonic acid, toluene sulfonic acid, ethyl, N-(phosphonomethyl)iminodiacetic acid, trifluoroacetic acid, maleic acid, alkylbenzene sulfonic acids, dodecylbenzene sulfonic acid, and any combination thereof. The concentration of the Bronsted acid in the treatment fluid may range from about 0.5% to about 10% wt. %. The at least one anhydride or dibasic ester may be selected from the group consisting of furan-2,5-dione, 2,3-dichloromaleic anhydride, 3-methlyfuran-2,5-dione, isobenzofuran-1,3-dione, 4-nitroisobenzofuran-1,3-dione, 4,5,6,7-tetrabromoisobenzofuran-1,3-dione, 4,5,6,7-tetrachloroisobenzofuran-1,3-dione, 1,2-cyclohexanedicarboxylic anhydride, bicyclo[2.2.1]hept-5-ene-2,3-dicarboxylic anhydride, 2,2,2-trifluoroacetic anhydride, dibenzyl malonate, dimethyl malonate, 2,2-dimethyl-1,3-dioxane-4,6-dione, dialkyl maleate, diaryl maleate, dialkyl phthalate, diaryl phthalate, dialkyl glutarate, diaryl glutarate, dimethyl 2-methylpentanedioate, dimethyl 2-ethylpentanedioate, dialkyl succinate, diaryl succinate, dialkyl adipate, diaryl adipate, and any combination of anhydride and/or dibasic ester. The concentration of the at least one anhydride or dibasic ester in the treatment fluid may range from about 40% to about 75% wt. %. The wetting agent may be a quaternized alkyl amine salt and/or a quaternized polyamine salt. The docking agent may be selected from the group consisting of 3-aminopropyltrimethoxysilane, N-(6-aminohexyl)aminomethyltriethoxysilane, N-(2-aminoethyl)-3-aminopropyltriethoxysilane, and N-(2-aminoethyl)-3-aminopropyltrimethoxysilane, and any combination thereof. The treatment fluid may not comprise a glycol-based diluent, wherein the treatment fluid may not comprise an aromatic-based diluent.

Provided are systems for treating a well with a treatment fluid in accordance with the disclosure and the illustrated FIGs. An example system comprises a treatment fluid comprising: a furan-based polymer, a Bronsted acid, at least one of an anhydride and/or dibasic ester, a wetting agent, and a docking agent. The system further comprises mixing equipment configured to mix the furan-based polymer, Bronsted acid, at least one anhydride or dibasic ester, wetting agent, and docking agent; and pumping equipment configured to pump the mixed treatment fluid in a wellbore.

Additionally or alternatively, the system may include one or more of the following features individually or in combination. The system may further comprise a gravel pack disposed in the wellbore. The system may further comprise proppant; wherein the treatment fluid contacts the proppant. The furan-based polymer may comprise a furan-based monomer selected from the group consisting of furfuryl alcohol, furfuryl acetate, 1-(2-furyl)-1-ethanol, 2-(2-furyl)-2-propanol, 2,5-bis(hydroxymethyl) furan, 1-(5-hydromethyl-2-furyl)-ethanol, 1,1-bis(5-hydroxymethyl-2-furyl)-ethane, 5-hydroxymethyl-2-vinylfuran, 5-hydroxymethyl furfural, 5-hydroxymethyl-2-furancaboxylic acid, 2,5-furandicarboxyaldehyde, 5-formyl-2-furancarboxylic acid, 2,5-furandicarboxylic acid, 5-hydroxymethyl furfurylidenester, and any combination thereof. The concentration of the furan-based polymer in the treatment fluid may range from about 15% to about 60% wt. c. The Bronsted acid may be selected from the group consisting of hydrogen bromide, hydrogen chloride, sulfuric acid, phosphoric acid, nitric acid, trifluoromethanesulfonic acid, 1,3,5-triazine-2,4,6-triol, methanesulfonic acid, toluene sulfonic acid, ethyl, N-(phosphonomethyl)iminodiacetic acid, trifluoroacetic acid, maleic acid, alkylbenzene sulfonic acids, dodecylbenzene sulfonic acid, and any combination thereof. The concentration of the Bronsted acid in the treatment fluid may range from about 0.5% to about 10% wt. %. The at least one anhydride or dibasic ester may be selected from the group consisting of furan-2,5-dione, 2,3-dichloromaleic anhydride, 3-methlyfuran-2,5-dione, isobenzofuran-1,3-dione, 4-nitroisobenzofuran-1,3-dione, 4,5,6,7-tetrabromoisobenzofuran-1,3-dione, 4,5,6,7-tetrachloroisobenzofuran-1,3-dione, 1,2-cyclohexanedicarboxylic anhydride, bicyclo[2.2.1]hept-5-ene-2,3-dicarboxylic anhydride, 2,2,2-trifluoroacetic anhydride, dibenzyl malonate, dimethyl malonate, 2,2-dimethyl-1,3-dioxane-4,6-dione, dialkyl maleate, diaryl maleate, dialkyl phthalate, diaryl phthalate, dialkyl glutarate, diaryl glutarate, dimethyl 2-methylpentanedioate, dimethyl 2-ethylpentanedioate, dialkyl succinate, diaryl succinate, dialkyl adipate, diaryl adipate, and any combination of anhydride and/or dibasic ester. The concentration of the at least one anhydride or dibasic ester in the treatment fluid may range from about 40% to about 75% wt. %. The wetting agent may be a quaternized alkyl amine salt and/or a quaternized polyamine salt. The docking agent may be selected from the group consisting of 3-aminopropyltrimethoxysilane, N-(6-N-(2-aminoethyl)-3-aminopropyltriethoxysilane, aminohexyl)aminomethyltriethoxysilane, and N-(2-aminoethyl)-3-aminopropyltrimethoxysilane, and any combination thereof. The treatment fluid may not comprise a glycol-based diluent, wherein the treatment fluid may not comprise an aromatic-based diluent.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a well using a treatment fluid, the method comprises:
    preparing a treatment fluid at the surface by combining components comprising: a furan-based polymer; a Bronsted acid; at least one of an anhydride and/or dibasic ester; a wetting agent comprising a quaternized alkyl amine salt and/or a quaternized polyamine salt; and a docking agent selected from the group consisting of 3-aminopropyltrimethoxysilane (APTMS), N-(6-aminohexyl)aminomethyl-triethoxysilane (AHAMTES), N-(2-aminoethyl)-3-aminopropyltriethoxysilane (AEAPTES), N-(2-aminoethyl)-3-aminopropyltrimethoxysilane (AEAPTMS), and any combination thereof;
    then introducing the prepared treatment fluid into a wellbore; and
    performing a wellbore operation with the treatment fluid.

2. The method of claim 1, wherein the wellbore has a temperature, and wherein the wellbore temperature at the location in the wellbore where the wellbore operation is performed is between about 65° F. to about 200° F.

3. The method of claim 1, wherein the treatment fluid is coated on a proppant before introduction into the wellbore.

4. The method of claim 1, wherein the wellbore penetrates a subterranean formation having a fracture; wherein the method further comprises introducing the treatment fluid into the fracture from the wellbore and contacting a proppant within the fracture with the treatment fluid.

5. The method of claim 1, wherein the wellbore operation comprises pumping the treatment fluid through a gravel pack disposed in the wellbore.

6. The method of claim 1, wherein the Bronsted acid is selected from the group consisting of hydrogen bromide, hydrogen chloride, sulfuric acid, phosphoric acid, nitric acid, trifluoromethanesulfonic acid, 1,3,5-triazine-2,4,6-triol, methanesulfonic acid, toluenesulfonic acid, N-(phosphonomethyl)iminodiacetic acid, trifluoroacetic acid, maleic acid, alkylbenzene sulfonic acids, dodecylbenzene sulfonic acid, and any combination thereof.

7. The method of claim 1, wherein the at least one anhydride or dibasic ester is selected from the group consisting of furan-2,5-dione, 2,3-dichloromaleic anhydride, 3-methlyfuran-2,5-dione, isobenzofuran-1,3-dione, 4-nitroisobenzofuran-1,3-dione, 4,5,6,7-tetrabromoisobenzofuran-1,3-dione, 4,5,6,7-tetrachloroisobenzofuran-1,3-dione, 1,2-cyclohexanedicarboxylic anhydride, bicyclo[2.2.1]hept-5-ene-2,3-dicarboxylic anhydride, 2,2,2-trifluoroacetic anhydride, dibenzyl malonate, dimethyl malonate, 2,2-dimethyl-1,3-dioxane-4,6-dione, dialkyl maleate, diaryl maleate, dialkyl phthalate, diaryl phthalate, dialkyl glutarate, diaryl glutarate, dimethyl 2-methylpentanedioate, dimethyl 2-ethylpentanedioate, dialkyl succinate, diaryl succinate, dialkyl adipate, diaryl adipate, and any combination thereof.

* * * * *